(12) United States Patent
Beller

(10) Patent No.: US 7,304,583 B2
(45) Date of Patent: Dec. 4, 2007

(54) DEVICE FOR DETECTING A DEFINED FILLING LEVEL OF A MEDIUM IN A CONTAINER

(75) Inventor: Johann Beller, Rosshaupten (DE)

(73) Assignee: Endress + Hauser Wetzer GmbH + Co. KG, Nesselwang (DE)

(*) Notice: Subject to any disclaimer, the term of this patent is extended or adjusted under 35 U.S.C. 154(b) by 187 days.

(21) Appl. No.: 10/509,334

(22) PCT Filed: Apr. 9, 2003

(86) PCT No.: PCT/EP03/03683

§ 371 (c)(1),
(2), (4) Date: May 9, 2005

(87) PCT Pub. No.: WO03/085364

PCT Pub. Date: Oct. 16, 2003

(65) Prior Publication Data

US 2005/0200491 A1    Sep. 15, 2005

(30) Foreign Application Priority Data

Apr. 10, 2002 (DE) .............................. 102 15 818

(51) Int. Cl.
*G08B 21/00* (2006.01)

(52) U.S. Cl. .................. 340/612; 340/618; 340/620; 73/290 R; 73/307; 73/304 R

(58) Field of Classification Search ................ 340/612, 340/618, 620, 604, 616; 73/304 R, 290 R, 73/307, 308; 137/392
See application file for complete search history.

(56) References Cited

U.S. PATENT DOCUMENTS

| | | | | | |
|---|---|---|---|---|---|
| 4,182,363 A | * | 1/1980 | Fuller | .......................... | 137/392 |
| 4,879,902 A | * | 11/1989 | Loniello | .................... | 73/304 R |
| 5,534,708 A | * | 7/1996 | Ellinger et al. | .............. | 250/577 |
| 5,898,374 A | * | 4/1999 | Schepka | ...................... | 340/603 |
| 5,901,740 A | * | 5/1999 | Sanchelima | .................. | 137/392 |
| 5,923,102 A | * | 7/1999 | Koenig et al. | ............... | 307/118 |
| 6,095,178 A | * | 8/2000 | Gilbert et al. | ............... | 137/199 |

* cited by examiner

*Primary Examiner*—Davetta W. Goins
(74) *Attorney, Agent, or Firm*—Bacon & Thomas, PLLC

(57) ABSTRACT

An apparatus for detecting a predefined fill level of a medium in a container having a lid by means of a conductive measuring system, which has at least two measuring electrodes extending into the container. A measurement current flowing between the two measuring electrodes is used to detect the reaching of the predefined fill level. The apparatus makes possible a differentiated detection of accretions on the lid of the container. According to one variant of the invention this is achieved by providing a compensation electrode, which is arranged such that the degree of fouling in the region of the lid of the container is determined on the basis of a current flowing between one of the measuring electrodes and the compensation electrode, caused by conductive accretions in the lid of the container.

28 Claims, 4 Drawing Sheets

DEVICE FOR DETECTING A DEFINED FILLING LEVEL OF A MEDIUM IN A CONTAINER

FIELD OF THE INVENTION

The invention relates to an apparatus for detecting a predefined fill level of a medium in a container having a lid, by means of a conductive measuring system, which has at least two measuring electrodes protruding into the container, wherein a measurement current flowing between the two measuring electrodes indicates the reaching of the predefined fill level. Preferably the container is a metering container of a metering system arranged in a sampler. However, the invention is not limited to this special application.

BACKGROUND OF THE INVENTION

Apparatuses of this type are used, for example, in automatic samplers. Samplers suited for the highly precise taking of liquid samples are available from the assignee, Eudress+Hauser for instance in the form of the 'ASP-Station 2000' sampler, wherein time, quantity, and flowrate proportional samples are taken using vacuum equipment. As already indicated, a metering system, utilizing, among other things, a metering container with a lid, serves for the highly precise sample collection.

In the ASP-Station 2000 sampler, the sample taking occurs in four steps: At the beginning of a sample taking, the outlet hose of the metering system is pneumatically clamped to close it, and a pump, in this instance a diaphragm pump, blows through the metering container to clear the suction line for the sample. In a second step, sample is sucked in, until two long conductivity probes, which are secured on the lid of the metering container, respond. Then, the desired sample volume is retained, and excess sample flows back to the location where the sample was taken. In a last step, the constricted outlet hose is opened, and the sample is drained into the appropriate sample bottle. The sample bottles are stored cooled in the ASP-Station 2000 sampler, for the purpose of sample preservation.

In the case of the ASP-Station 2000 sampler, three conductivity probes of different length are secured on the lid of the metering container. The two longer conductivity probes come into contact with the sample medium at the end of the suction phase. Via a current flowing between the conductivity probes, the desired amount of filling of the metering container is detected. The suction procedure is ended, as soon as a current flows between the two conductivity probes.

If conductive substrate deposits in the region of the container lid—thus, if an undesired fouling occurs in the region of the container lid—then both a disturbance current flows between one of the measuring electrodes and the short electrode, and, also, current flows between the two long measuring electrodes. The result of this combination of currents is an immediate safety shutdown of the metering system, with issuance of a corresponding report (Error—Conductivity 2 and/or Error—Conductivity 1) to the operating personnel.

Problematic in the case of the known solution is that, especially in the case of sample media of high conductivity, conductive fouling of the container lid can occur, so that, as a result, a conductive path arises between the electrodes, even only after a relatively short time of operation of the metering system. Now, the resistance of the conductive fouling is, usually, a multiple less than the resistance of the sample medium itself. Thus, with the known solution, as soon as a conductive fouling occurs in the region of the lid of the container, the functioning of the conductive measuring system as a conductive switch is no longer reliable. Consequently, the metering system is promptly shut down and can only be restarted, after the accretions on the lid of the container have been removed. Since this clearing work sometimes has to be repeated in very short cycles, the known sampler can be used for certain sample media only with relatively high maintenance effort. A high maintenance effort is, understandably, undesired.

The following can be concluded: The solution known from the state of the art is not able to recognize the desired fill level of a medium in a container, once conductive accretions have formed on the lid of the container. The metering system is, consequently, shut down, even though this is not really necessary in a number of cases, since the fouling is actually still at a manageable level.

Indeed, there is yet a short, safety electrode arranged on the lid of the metering container of the ASP-Station. However, this safety electrode serves solely for switching off for reasons of safety. If no switching off occurs on the basis of the two long measuring electrodes (e.g. due to an electronics malfunction or to the fact that the measuring electrodes have been fouled by non-conductive material, e.g. fat), then, upon the reaching of a second, predefined fill level, the short safety electrode becomes contacted by the sample medium; this leads, promptly, to a safety shut down, with the accompanying issuance of a report. On the basis of this switching off for reasons of safety, an incursion of the sample medium into the pneumatic control and the vacuum pump is effectively prevented.

SUMMARY OF THE INVENTION

An object of the invention is to provide an apparatus in which the reaching of a predefined fill level in a container, especially in a metering container of a sampler, is detected with a high level of safety, even in the case of conductive fouling in the region of the container lid.

The object is achieved in a first variant of the invention by the provision of a compensation electrode, which is arranged and connected such that a disturbance current, flowing between one of the measuring electrodes and the compensation electrode because of conductive accretions in the lid of the container, gets drained, via the compensation electrode, preferably to ground. Thus, according to the invention, the disturbance current gets largely coupled out of the actual measuring circuit serving to determine the attainment of the predefined fill level.

In this way, it becomes possible to still reliably perform the monitoring of the fill level, even when conductive accretions have already developed to a not insignificant layer thickness in the region of the container lid.

The object is achieved in a second variant of the invention by providing a compensation electrode, which is arranged and connected such that, on the basis of a disturbance current, flowing between one of the measuring electrodes and the compensation electrode due to accretions in the lid of the container, the degree of fouling in the region of the lid of the container is determined.

This solution of the invention thus does not limit itself to the issuing of a report that a conductive fouling is present, but, instead, it enables a report of the degree of the fouling. In the concrete case of a metering system of a sampler, this means the following: a report to the personnel, that a cleaning of the container lid is required, or that a suitable other measure must be instituted, is first brought up, after a predetermined, tolerable, limit value for the degree of fouling has been exceeded. The solution of the invention enables significant reduction of the maintenance work on the sampler. The invention is thus very important with regard to measures connected with the topic of 'Predictive Maintenance'.

In an advantageous further development of the apparatus of the invention, the two measuring electrodes are secured to the lid of the container. Preferably, the two measuring electrodes are cylindrical or columnar in shape.

A preferred embodiment of the apparatus of the invention provides that the compensation electrode is constructed and arranged for determining the degree of fouling in the region of the lid of the container such that it is not contacted by the medium upon the reaching of the predefined fill level.

Additionally, it is provided that the compensation electrode is plate-shaped and arranged in the immediate vicinity of the lid of the container. Moreover, the compensation electrode can be arranged symmetrically between the two measuring electrodes. Of course, any other kind of arrangement of electrodes is likewise possible, so long as the electrodes are realized in keeping with the basic ideas of the apparatus of the invention. Thus, it is even possible, for instance, to arrange the compensation electrode annularly—open or closed—around one of the measuring electrodes.

A favorable form of embodiment of the apparatus of the invention includes a first current measuring unit, which provides information concerning the reaching of the predefined fill level on the basis of a current flowing between the two measuring electrodes. Preferably associated with the first current measuring unit is a first evaluating unit, which uses the particular value of the current measured by the first current measuring unit to detect and, if necessary, signalize, the reaching of the predefined fill level. This information is, in the case of a metering apparatus, forwarded to the process flow control for the metering operation. The evaluating unit is, in the simplest case, at least one comparator.

In a preferred further development of the apparatus of the invention, a second current measuring unit is provided, which provides information concerning the degree of fouling of the lid on the basis of a current flowing between one of the two measuring electrodes and the compensation electrode. Additionally, associated with the second current measuring unit is a second evaluating unit, which uses the output signal of the current measured by the second current measuring unit to detect and, if necessary, signalize, that a predetermined degree of fouling has been reached and/or what degree of fouling has been reached. Again, the evaluating unit can be at least one comparator. Preferably, however, the evaluating unit is a microprocessor. A memory unit is provided for the microprocessor. The memory unit stores characteristic curves and/or data, which provide the degree of fouling on the lid of the container for the different materials as a function of the electrical current values measured between one of the two measuring electrodes and the monitoring electrode.

An advantageous embodiment of the apparatus of the invention provides that the evaluating unit sets an alarm signal, as soon as the degree of fouling on the lid of the container has exceeded a predetermined, tolerable degree of fouling. As soon as this alarm signal is set, the operating personnel know that a cleaning of the lid is required promptly or in the near future.

In an especially advantageous embodiment of the apparatus of the invention, the compensation electrode can be constructed such that it works as a safety electrode, this also enabling error reports and/or a safety shutdown, when the conductive measurement system fails on the basis of malfunctions in the electronics or due to non-conductive deposits on the measuring electrodes. For this purpose, the compensation electrode is constructed such that it has a projection, which comes into contact with the sample medium in the case of a predefined, second fill level; the evaluating unit then senses a current change, which is interpreted in the measuring system for the disturbance current, as a malfunction of the conductive measuring system and brings about the issuance of a corresponding error report and/or an immediate safety shutdown.

BRIEF DESCRIPTION OF THE DRAWINGS

The invention will now be explained in greater detail on the basis of the accompanying drawings, the figures of which show as follows.

DESCRIPTION OF THE PREFERRED EMBODIMENTS

Figure 1:
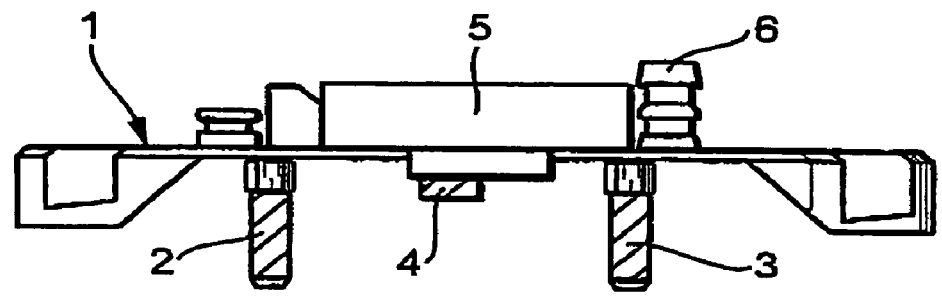
FIG. 1 a cross section according to the cutting plane A-A of FIG. 2.
Figure 2:
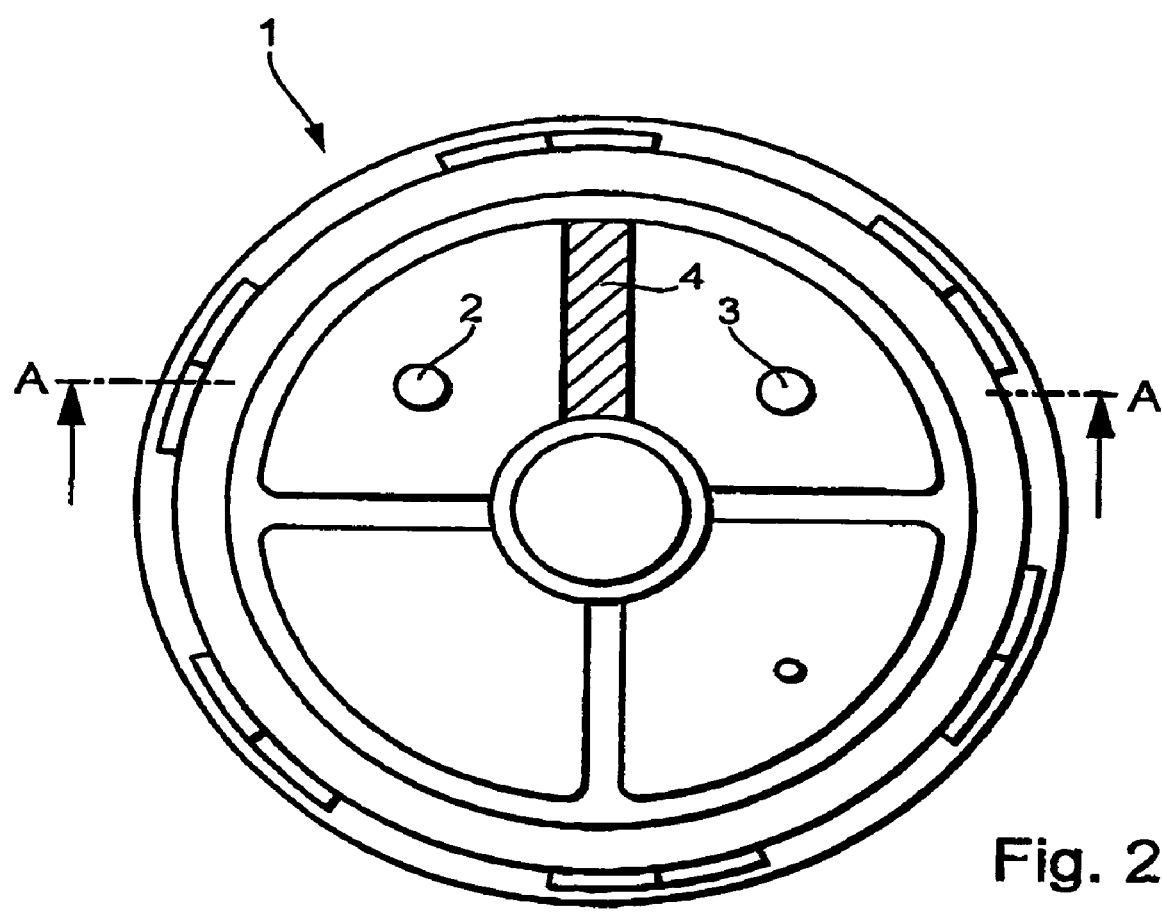
FIG. 2 a plan view of a preferred embodiment of the apparatus of the invention.

FIG. 2 shows a plan view of a preferred embodiment of the apparatus of the invention. FIG. 1 is a cross sectional view taken along the plane A-A of FIG. 2. By way of example, the ideas of the invention are described in the following on the basis of a metering system, which is applied e.g. in a sampler. As already indicated above, the apparatus of the invention is in no way limited to this special case of application.

Figure 3:
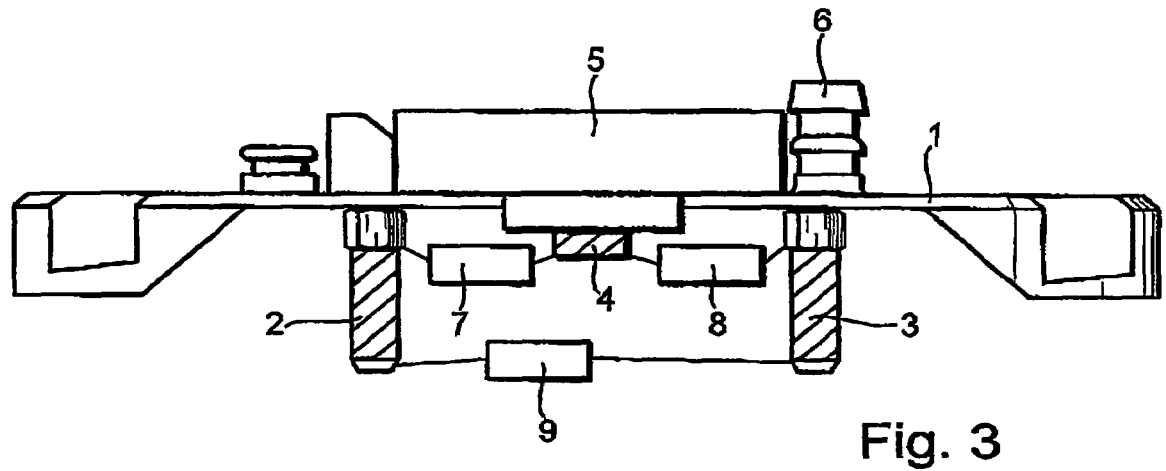
FIG. 3 the cross section of FIG. 1, showing equivalent resistances.

Two measuring electrodes 2, 3 are secured to the lid 1 of a container (not shown). During operation, the two, cylindrical, measuring electrodes 2, 3 extend into the metering container a predetermined distance established by their size. As soon as both measuring electrodes 2, 3 come into contact with the conductive sample medium at the end of the suction procedure, a measurement current $I_M$ flows between the two measuring electrodes 2, 3. The measurement current depends on the conductivity, or resistance, of the process medium. The corresponding resistance of the sample medium is represented in FIG. 3 by the equivalent resistance 9. A signal, that the predefined fill level has been reached, is forwarded to the process flow control.

The compensation electrode 4 is arranged between the two measuring electrodes 2, 3. The compensation electrode is sheet-like, especially plate-shaped, and lies against the inner side of the lid. Since the compensation electrode 4 does not protrude into the container like the measuring electrodes 2, 3, it is assured that the compensation electrode does not come into direct contact with the sample medium upon the reaching of the maximum fill level.

As soon as conductive accretions form on the lid 1 of the container, a disturbance current $I_D$ begins to flow between the measuring electrodes 2, 3 and the compensation electrode 4. The corresponding equivalent resistances of the conductive accretions deposited on the lid 1 of the container are represented in FIG. 3 by the resistors 7 and 8.

Also indicated in FIGS. 1 and 3 are the suction line 5 for the process medium and the connection nozzle 6 for the compressed air line.

Figure 4:
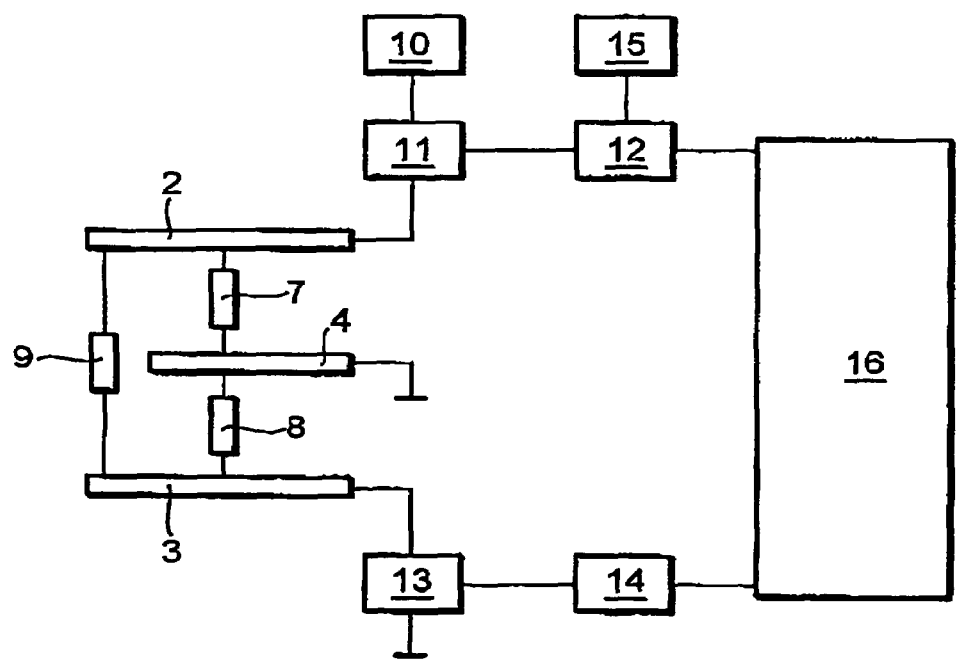
FIG. 4 a block diagram of a preferred form of embodiment of the apparatus of the invention.

FIG. 4 is a block diagram of a preferred form of embodiment of the apparatus of the invention. Voltage source 10 provides a current-limited, alternating voltage, which is preferably smaller than 24 V. While the current measuring unit 11 is used for determining the degree of fouling of the lid 1 of the container, the current measuring unit 13 is for determining the attainment of the predefined fill level in the container.

If there is neither an electrical connection between the two measuring electrodes 2, 3, nor between one of the two measuring electrodes 2, 3 and the compensation electrode 4, then this means that the predefined fill level has not yet been reached and that there are no conductive accretions in the region of the lid 1 of the container. If the current measuring unit 13 subsequently registers a measurement current $I_M$ and the evaluating unit 14 detects that the value of the current $I_M$ lies above a predetermined, desired value, then a corresponding signal is forwarded to the process flow control 16. This immediately triggers execution of the necessary steps. In the case of detecting the fill level in a metering container of a sampler, a necessary step is the immediate halting of the suction procedure.

The evaluating unit 14 is, in the simplest case, a comparator. Of course, the evaluating unit 14 can also be a microprocessor, which evaluates the measured electrical current values of the current measuring unit 13 on the basis of a desired value versus actual value algorithm.

Let us now consider the case in which conductive accretions have formed on the lid 1 of the container. Without the compensation electrode 4, the disturbance current $I_D$ would flow via the sum of the resistances 7, 8 through the current measuring unit 13. Since the current $I_D$ is usually significantly greater than the current $I_M$ representing the reaching of the predefined fill level, the evaluating unit 14 signals continuously and erroneously that the predefined fill level has been reached in the container. Consequently, the metering apparatus is no longer usable.

With the interposed compensation electrode 4, the disturbance current $I_D$ is now drained to ground, i.e. the disturbance current $I_D$ no longer flows through the current measuring unit 13. True, a part of the measurement current $I_M$ is drained through the resistance 8 and the compensation electrode 4 to ground. However, since the internal resistance of the current measuring unit 13 is selected to be very small, the resistance 8 only first influences the conductivity measurement serving for detecting the fill level of the sample medium in the container, after the value of resistance 8 has become extremely low. However, an extremely low value of resistance does not occur, until the degree of fouling on the lid 1 of the container has reached a very high level.

Thus, according to the invention, it is possible, even in the case of a significant fouling in the region of the lid 1 of the container, to determine the measurement current $I_M$ accurately and, thus, to perform the conductivity measurement undisturbed. As already indicated, the maintenance work on the metering system is reduced very considerably by the solutions of the invention, since the accretions in the region of the container lid can now be removed at significantly greater time intervals.

According to an advantageous further development of the apparatus of the invention, the degree of fouling on the lid 1 of the container can, moreover, be determined to any accuracy. For this purpose, the disturbance current $I_D$ is measured in the current measuring unit 11. The corresponding value is forwarded to the evaluating unit 12 connected thereto. In the illustrated case, evaluating unit 12 is a microprocessor with an associated memory unit 15. Memory unit 15 stores functions and/or data, which provide the degree of fouling of the lid 1 of the container as a function of the electrical current values for materials of different conductivity. If the evaluating unit 12 receives the information on the conductivity, or the type, of the accretions, then the degree of fouling of the lid 1 of the container can be determined with high accuracy on the basis of the stored data and/or characteristic curves.

Additionally, an advantageous further development of the apparatus of the invention makes it possible to provide reliable statements concerning at what point in time the next cleaning of the lid 1 of the container will probably be necessary. Such statements are of major importance in connection with predicative maintenance in all areas of measurement technology.

Figure 5:
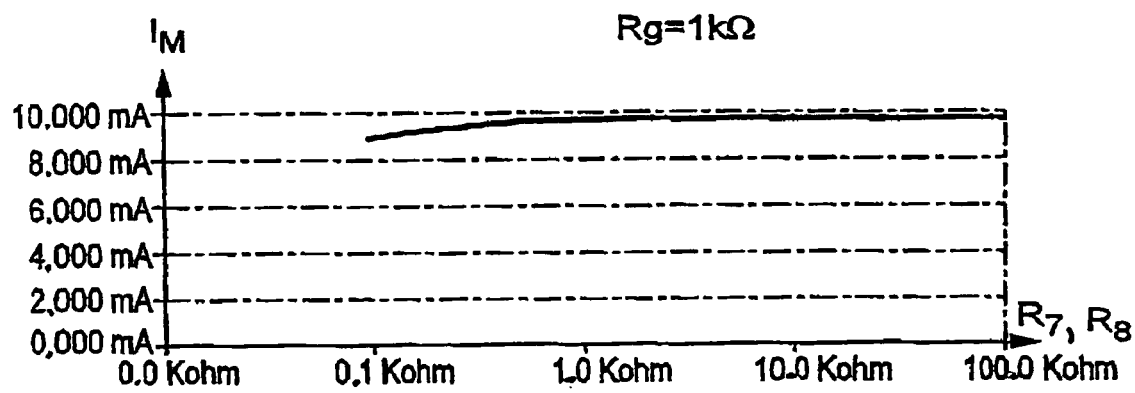
FIG. 5 a graph of measurement current as a function of the degree of fouling in the case of a first conductivity of the sample medium.
Figure 6:
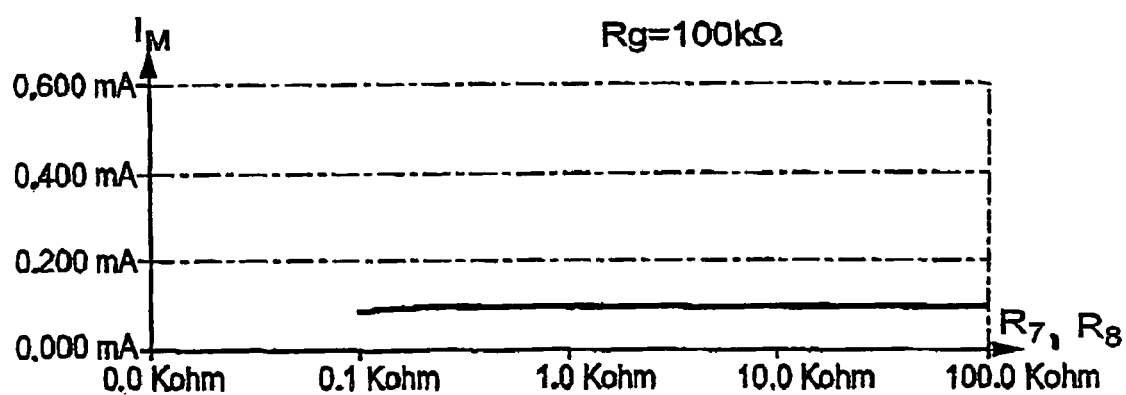
FIG. 6 a graph of measurement current as a function of the degree of fouling in the case of a second conductivity of the sample medium.

FIG. 5 is a graph of the measurement current $I_M$ as a function of the degree of fouling for the case of a first conductivity of the sample medium; FIG. 6 shows a corresponding graph of the measurement current $I_M$ as a function of the degree of fouling in the case of a second, significantly smaller conductivity of the sample medium. In both cases, it was assumed that the internal resistance of the current measuring unit 11 and the internal resistance of the current measuring unit 13 are equal. By way of example, an internal resistance of 10 ohms was assumed. On the basis of the diagrams, it can be seen that even in the case where the resistance 7 or 8 of the fouling is smaller than the resistance 9 of the sample medium by a factor of 1000, this has scarcely any effect on the measurement current $I_M$.

Figure 7:
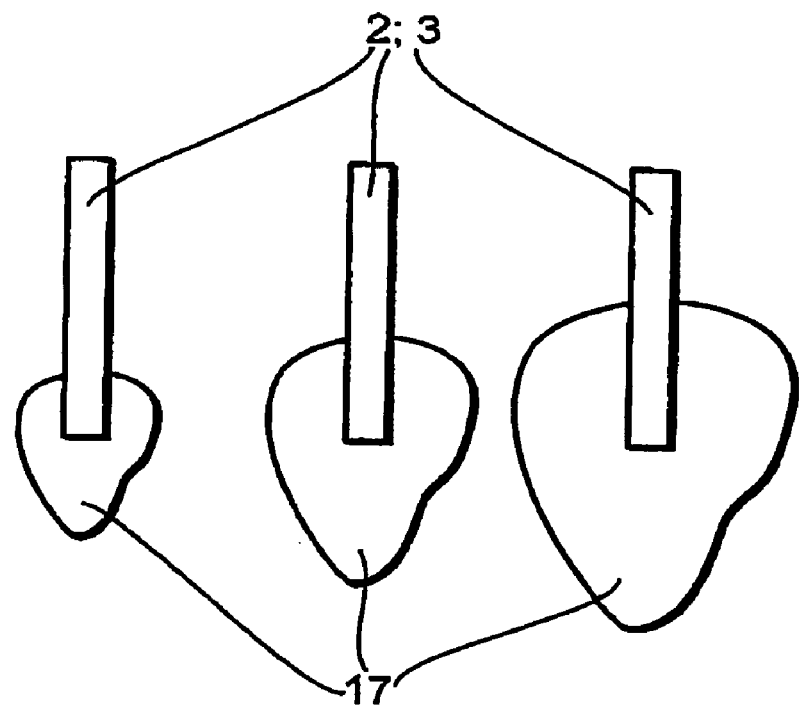
FIG. 7 a schematic illustration of increase of the degree of fouling at an electrode.

FIG. 7 is a schematic representation of the increasing of the degree of fouling at one of the measuring electrodes 2, 3 and the effects, which this fouling has, on the conductive measuring system known from the state of the art. As already mentioned above, the two long measuring electrodes of the known solution serve for detecting the reaching of the first predefined fill level, while the shorter, safety electrode effects a possibly necessary safety shutdown of the metering apparatus. The safety electrode serves only for a safety shutdown in the case of a malfunction in the electronics or in the case of accretions of non-conducting materials; if, in the known solution, an electrical connection of the measuring electrodes 2, 3 occurs due to conductive accretions, then the metering apparatus fails, since attainment of the predefined fill level is then signaled continuously. In the case of the left measuring electrode 2, 3 of FIG. 7, the non-conductive accretions are still small; however, as one progresses to the right, they get progressively greater. Consequently, the conductive part of the measuring electrode 2, 3 retreats progressively upwards. As a result, also the fill level in e.g. a metering container continues to rise, until finally the short, safety electrode known from the state of the art comes into contact with the sample medium and effects the already described safety shutdown.

According to an advantageous embodiment of the solution of the invention, the compensation electrode additionally assumes this safety shutdown in the case of non-conductive accretions: If also here, no shutdown of the metering procedure is effected by the long measuring electrodes 2, 3 (e.g. due to an electronics malfunction or due to the fact that the measuring electrodes are fouled by non-conducting material, e.g. fat), then the shorter compensation electrode 4 eventually is contacted by the sample medium, and then also here a safety shutdown occurs, with report. An incursion of sample medium into the pneumatic control and vacuum pump is, consequently, effectively prevented.

Figure 8:
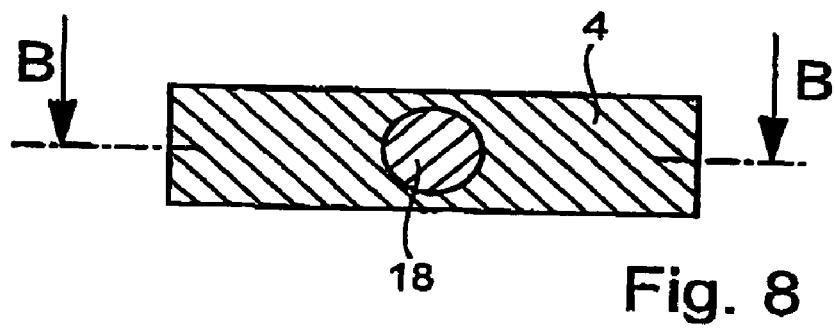
FIG. 8 a plan view of a preferred embodiment of the compensation electrode.
Figure 9:
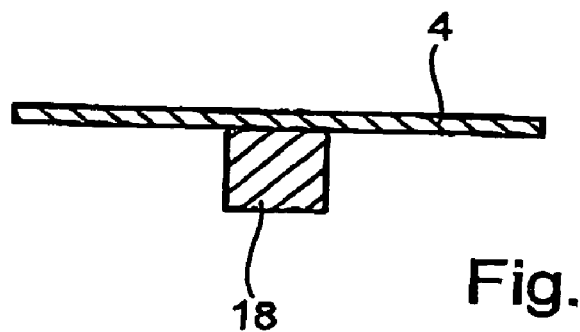
FIG. 9 a longitudinal section taken according to the cutting plane B-B of FIG. 8.

FIG. 8 shows a plan view of a preferred embodiment of the compensation electrode; FIG. 9 is a longitudinal section taken on the cutting plane B-B of FIG. 8.

The principle of operation of the preferred embodiment of the solution of the invention is as follows: If a non-conducting fouling accumulates on the long measuring electrodes 2, 3 from the bottom up, then the measurement current $I_M$ does not rise to the predetermined target value upon the reaching of the predefined fill level, even though the measuring electrodes 2, 3 are already contacted by the sample medium. The container continues to get fuller, until, subsequently, the cylinder-shaped part (projection 18) of the compensation electrode 4 comes in contact with the sample medium. This contact effects a current change in the current measuring unit 11. This current change can be used, e.g. during the suction procedure, as criterion for determining that the compensation electrode 4 is being contacted by the sample medium and that the two long measuring electrodes are, therefore, malfunctioning. In turn, the evaluating unit 14, or the flow control 16, triggers a safety shutdown, with report.

The invention claimed is:

1. Apparatus for detecting a predefined fill level of a medium in a container by means of a conductive measuring system, the container including a lid, including:
   at least two measuring electrodes extending into the container, wherein a measurement current flowing between said at least two measuring electrodes is used for detecting when the predefined fill level is reached; and
   a compensation electrode, which is so arranged and connected that a disturbance current flowing between one of said at least two measuring electrodes and said compensation electrode due to conductive accretions on the lid of the container is drained away via said compensation electrode, wherein:
   said at least two measuring electrodes and said compensation electrode are secured to the lid of the container.

2. Apparatus for detecting a predefined fill level of a medium in a container by means of a conductive measuring system, the container including a lid, including:
   at least two measuring electrodes extending into the container, wherein a measurement current flowing between said at least two measuring electrodes is used for detecting when the predefined fill level is reached; and
   a compensation electrode, which is so arranged and/or connected that, on the basis of a disturbance current flowing between one of said at least two measuring electrodes and said compensation electrode due to conductive accretions on the lid of the container, the degree of fouling in the region of the lid of the container is determined wherein
   said at least two measuring electrodes and said compensation electrode are secured to the lid of the container.

3. The apparatus as claimed in claim 1, wherein:
said at least two measuring electrodes are secured to the lid of the container.

4. The apparatus as claimed in claim 3, wherein:
said at least two measuring electrodes are cylindrical or columnar.

5. The apparatus as claimed in claim 1, wherein:
said compensation electrode is constructed and arranged such that it is not contacted by the medium upon the reaching of the predefined fill level.

6. The apparatus as claimed in claim 5, wherein:
said compensation electrode is plate-shaped and arranged on the lid of the container.

7. The apparatus as claimed in claim 1, wherein:
said compensation electrode is arranged symmetrically between said at least two measuring electrodes.

8. The apparatus as claimed in claim 1, further including:
a first current measuring unit, which provides information concerning the reaching of the predefined fill level on the basis of the measurement current flowing between said at least two measuring electrodes.

9. The apparatus as claimed in claim 8, further including:
a first evaluating unit, which, on the basis of the measurement current registered by said first current measuring unit, detects and, if necessary, signals when the predefined fill level has been reached.

10. The apparatus as claimed in claim 1, further including:
a second current measuring unit, which, on the basis of the disturbance current flowing between one of said at least two measuring electrodes and said compensation electrode, makes information available concerning the degree of fouling on the lid of the container.

11. The apparatus as claimed in claim 10, further including:
a second evaluating unit, which, on the basis of the disturbance current determined in said second current measuring unit, detects and, if necessary, signals that a predetermined degree of fouling has been reached or which degree of fouling has been reached.

12. The apparatus as claimed in claim 11, further including:
a memory unit associated with said second evaluating unit, in which characteristic curves and/or data are stored, which give the degree of fouling on the lid of the container as a function of the disturbance current flowing between one of said at least two measuring electrodes and said compensation electrode.

13. The apparatus as claimed in claim 11, further including:
a flow control, wherein:
said second evaluating unit or said flow control sets an alarm signal, as soon as the degree of fouling on the lid of the container exceeds a predetermined, tolerable degree of fouling.

14. The apparatus as claimed in claim 1, wherein:
the container is a metering container for a sampler.

15. The apparatus as claimed in claim 1, wherein:
said compensation electrode is constructed such that it has a projection, which comes into contact with the sample medium at a predefined, second fill level; and
said final evaluating unit, in the case of a non-conductive sample medium, interprets a current change in said measuring unit as a malfunction of the conductive measuring system.

16. The apparatus as claimed in claim 2, wherein:
said at least two measuring electrodes are secured to the lid of the container.

17. The apparatus as claimed in claim 3, wherein:
said at least two measuring electrodes are cylindrical or columnar.

18. The apparatus as claimed in claim 2, wherein:
said compensation electrode is constructed and arranged such that it is not contacted by the medium upon the reaching of the predefined fill level.

19. The apparatus as claimed in claim 18, wherein:
said compensation electrode is plate-shaped and arranged on the lid of the container.

20. The apparatus as claimed in claim 2, wherein:
said compensation electrode is arranged symmetrically between said at least two measuring electrodes.

21. The apparatus as claimed in claim 2, further including:
a first current measuring unit, which provides information concerning the reaching of the predefined fill level on the basis of the measurement current flowing between said at least two measuring electrodes.

22. The apparatus as claimed in claim 21, further including:
a first evaluating unit, which, on the basis of the measurement current registered by said first current measuring unit, detects and, if necessary, signals when the predefined fill level has been reached.

23. The apparatus as claimed in claim 2, further including:
a second current measuring unit, which, on the basis of the disturbance current flowing between one of said at least two measuring electrodes and said compensation electrode, makes information available concerning the degree of fouling on the lid of the container.

24. The apparatus as claimed in claim 23, further including:
a second evaluating unit, which, on the basis of the disturbance current determined in said second current measuring unit, detects and, if necessary, signals that a predetermined degree of fouling has been reached or which degree of fouling has been reached.

25. The apparatus as claimed in claim 24, further including:
a memory unit associated with said second evaluating unit, in which characteristic curves and/or data are stored, which give the degree of fouling on the lid of the container as a function of the disturbance current flowing between one of said at least two measuring electrodes and said compensation electrode.

26. The apparatus as claimed in claim 24, further including:
a flow control, wherein:
said second evaluating unit or said flow control sets an alarm signal, as soon as the degree of fouling on the lid of the container exceeds a predetermined, tolerable degree of fouling.

27. The apparatus as claimed in claim 2, wherein:
the container is a metering container for a sampler.

28. The apparatus as claimed in claim 2, wherein:
said compensation electrode is constructed such that it has a projection, which comes into contact with the sample medium at a predefined, second fill level; and
said final evaluating unit, in the case of a non-conductive sample medium, interprets a current change in said measuring unit as a malfunction of the conductive measuring system.

* * * * *